I. ISRAEL.
NESTING DEVICE.
APPLICATION FILED MAY 10, 1921.

1,424,647.

Patented Aug. 1, 1922.
2 SHEETS—SHEET 1.

Inventor
Isaac Israel
By his Attorney

I. ISRAEL.
NESTING DEVICE.
APPLICATION FILED MAY 10, 1921.
1,424,647.
Patented Aug. 1, 1922.
2 SHEETS—SHEET 2.
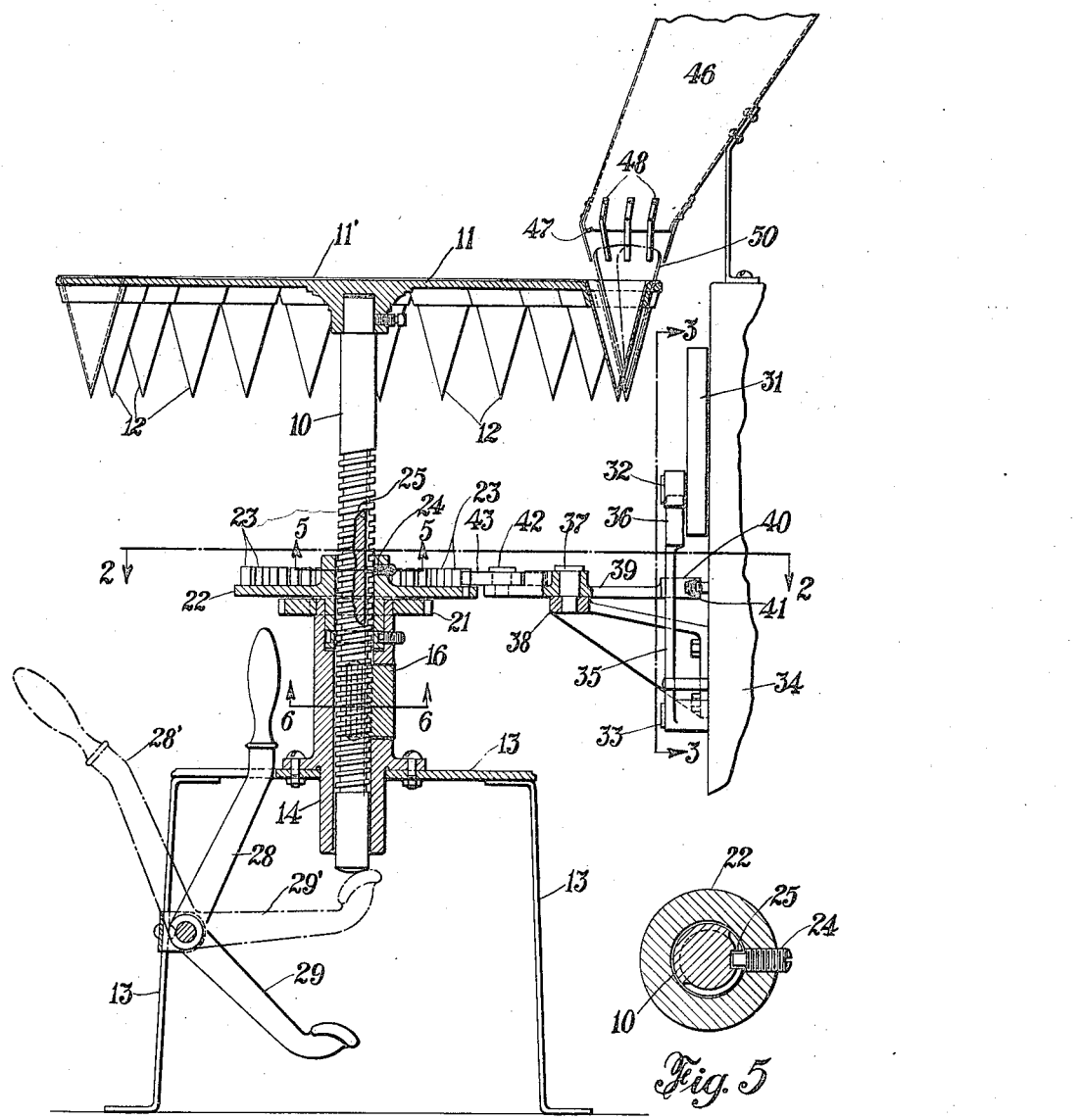
Fig. 4
Fig. 5
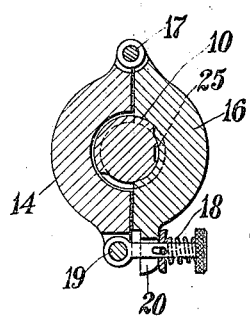
Fig. 6
Inventor
Isaac Israel
By his Attorney

UNITED STATES PATENT OFFICE.

ISAAC ISRAEL, OF NEW YORK, N. Y.

NESTING DEVICE.

1,424,647. Specification of Letters Patent. Patented Aug. 1, 1922.

Application filed May 10, 1921. Serial No. 468,404.

*To all whom it may concern:*

Be it known that I, ISAAC ISRAEL, a citizen of the United States, residing at New York city, in the county of New York, borough of Manhattan, and State of New York, have invented new and useful Improvements in Nesting Devices, of which the following is a full, clear, and exact specification.

My invention relates to devices suitable for the piling, or nesting, of articles and receptables and refers particularly to devices suitable for the nesting of ice-cream cones.

Experience has shown that on account of the shape and fragile nature of ice-cream cones, the most advantageous method of preparing them for transportation is to nest them within each other and then place these nested cones within a protective container.

Considerable difficulty is experienced in the manual nesting of cones. As the cones are very hot when made, there is the difficulty incident to such nesting by hand. If the cones are nested when too hot, they are liable to adhere to each other. The labor item is a large one. There is the danger of breakage incident to manual handling of such a fragile product. There are the unhygienic conditions incident to handling food products. In addition, there is the requirement of constant attention and supervision.

My invention overcomes all of these difficulties and presents a device whereby ice-cream cones can be effectively, hygienically and safely nested with a minimum of expense and time without the dangers of breakage or adherence.

My device is particularly suitable for engagement with those cone-making machines which produce and deliver cones of uniform size at regular intervals of time, as it can be so attached thereto that the cone-making mechanism will operate my nesting device as to cause the two to have synchronized movements, thus nesting the cones with the same regularity as that in which they are produced.

As the cone-making devices are no part of my present invention, they are not included nor described herein.

The device of my invention comprises a revoluble table carrying a plurality of hollow receivers the shape and size of the ice-cream cones to be nested, the table being intermittently revolved, so that at the period of its rest, one of the receivers will be situated below a delivering member of a cone-making machine, said period of rest being coincident with the deposition of a cone within the receiver. The revolution of the table causes it to have a downwardly vertical movement so as to lower it sufficiently to allow of the deposition of additional cones within those already nested.

By the above-mentioned device, a cone will be deposited within a receiver, the table revolved, a cone deposited in the next receiver and this operation repeated until each receiver carries a cone. The table and the receivers have now been lowered sufficiently to allow of the deposition, or nesting, of another cone within each cone already within each receiver, and this operation is repeated until the required number of cones have been nested, when they are removed and placed within the transport protective container.

It is to be noted that during this operation, each cone is allowed to partially cool before the insertion of the next cone therein, thus overcoming the tendency to adhere and that the operation is entirely automatic requiring no operative attention.

In the accompanying drawings, illustrating one form of the device of my invention, similar parts are designated by similar numerals:—

Figure 4 is a section through the line 4—4 of Figure 1.

Figure 5 is a section through the line 5—5 of Figure 4.

Figure 6 is a section through the line 6—6 of Figure 4.

Figure 1:
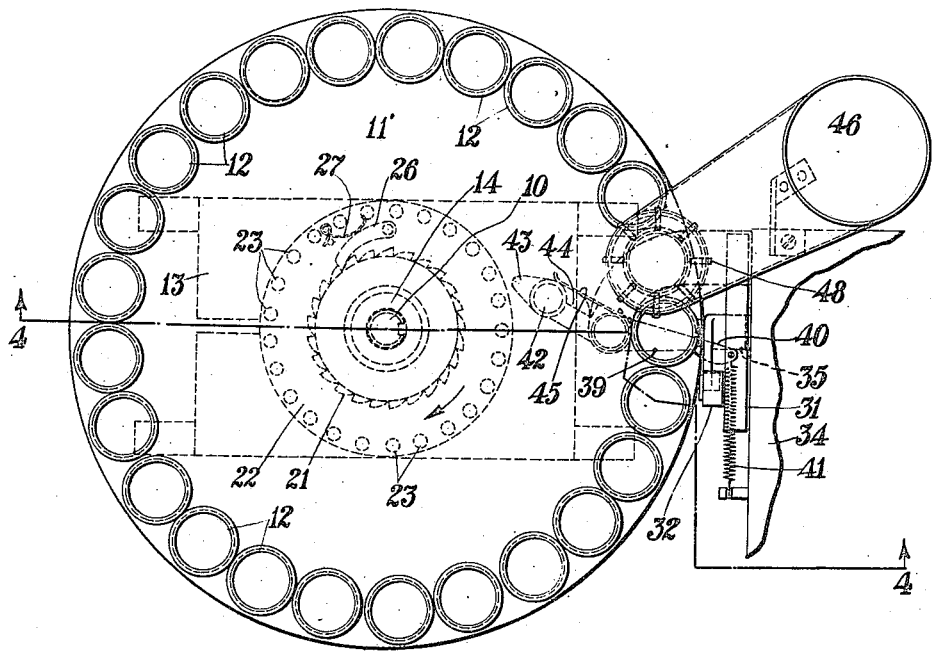
Figure 1 is a top plan view of one form of my device.
Figure 2:
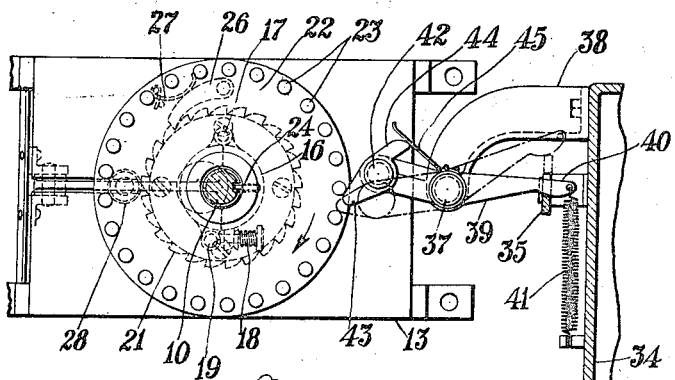
Figure 2 is a section through the line 2—2 of Figure 4.
Figure 3:
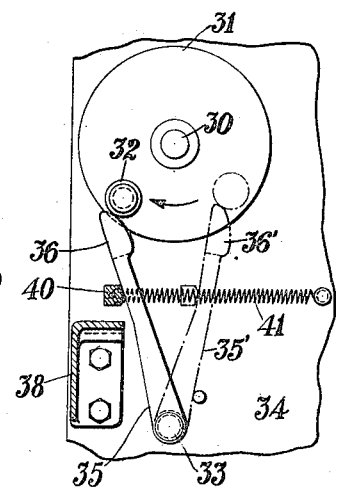
Figure 3 is a section through the line 3—3 of Figure 4.

The particular form of the device of my invention, shown in the accompanying drawings, comprises a revoluble threaded shaft 10, to which is fixedy attached an annular table, or member, 11, having a plurality of openings, through which are passed a plurality of downwardly disposed hollow conical cone receivers 12, 12, 12, which are fixedly attached to the plate 11', capable of being placed upon, and carried by, the table 11. A supporting frame 13, 13, 13 carries a sleeve 14, within which the shaft 10 is vertically slidable, said sleeve having a smooth bore. A semi-cylindrical portion of the sleeve 14 is cut out and replaced by a pivotal member 16, pivoted at 17, and locked by means of the swivel locking member 18 pivoted to the sleeve 14 at 19 and capable of abutment upon the extended arm 20 of the member 16. The member 16 is interiorally threaded to mesh with the thread upon the shaft 10. The upper portion of the sleeve 14 carries a fixedly attached annular toothed sprocket 21, which, in turn, carries the annular plate 22 having a series of extended pins 23, 23. A pin 24, threaded through a portion of the plate 22, extends into the vertical slot 25 of the shaft 10, thus allowing the plate 22 to revolve with the shaft 10 and to be capable of vertical movement along the shaft. A pawl 26, carried by the member 22, is maintained in enmeshment with the teeth of the sprocket 21 by means of the spring 27.

It is evident, from the above description, that when the plate 22 is revolved, it will revolve the shaft 10, thus revolving the table 11, and the plate 11', and, because of the threaded member 16, the shaft 10 will have an upwardly, or downwardly, vertical movement corresponding to its direction of rotation. When the shaft 10 has reached its lowest desired position, the member 16 is opened and, by means of the pivotal arm 28, 29, the shaft 10 and its attached members, are moved vertically upwardly, as the shaft being then unmeshed from the member 16, is free to slide through the sleeve 14. When the shaft has been raised to the desired position, the member 16 is meshed with it and locked in position, thus holding the shaft and allowing the further revolution and threaded vertical movement of the shaft.

A revoluble shaft 30 carries the annular plate 31, having an extended pin 32. Pivotally attached at 33, to the support 34, is an arm 35, with a head member 36, so situated that the revolution of the plate 31 will cause the pin 32 to abut upon the head 36 of the arm 35, causing the arm to move from the position 35' to 35.

Pivotally attached at 37, to the supporting member 38, is an arm 39, one end portion of which, 40, abuts upon the arm 35 and is held in abutment therewith by means of the spring 41. Pivotally attached at 42 of the other end of the arm 39, is a member 43, the end 44 of which is abutable upon the arm 39, and is held in this position normally by the spring 45. The arm 39 is so situated that when it is moved upon the pivot 37, the arm 43 will abut upon one of the pins 23 of the plate 22 and revolve the plate, the arm 39 being capable of return movement as the arm 43, due to the pivotal movement, will pass over the pin. The pawl 26 and the sprocket 21, prevent a return movement of the plate 22.

Situated above the table 11, and the plate 11', is a cone chute 46 terminating in the opening 47, around which are guide pieces 48, 48, preferably of weak metal, so that the cone will be placed in a vertical position but will not be retained within the chute, as the weight of each cone is sufficient to open up the guide pieces 48, 48 and allow the cone 50 to drop.

The operation of the device is as follows:—

The shaft 30 is revolved, thus revolving the plate 31, the pin 32 abutting upon the head 36 of the arm 35 at every revolution, giving the arm a pivotal movement. This movement of the arm 35 gives the arm 39 a pivotal movement, causing the member 43, of the arm 39, to abut upon a pin 23, of the plate 22, causing the latter to revolve. As the pin 32 passes beyond engagement with the head 36 of the arm 35 the spring 41 will act to bring the arms 35 and 39 to their original position, the arm 43 passing over the pins 23, 23 and the pawl 26 retaining the plate 22 from a return movement. As the pins 23, 23 correspond with the conical cone-holders 12, 12, the revolution of the shaft 30 revolves the table 11 and the plate 11' intermittently, and the delivering of cones is so timed that, one is released from the chute 46, each time a cone holder is at rest beneath it, so that a cone is placed in a cone holder, the table revolved the distance of one cone holder and a cone deposited therein, and this operation is continued and, as the table 11 has a gradual downwardly movement during its revolution, a plurality of cones may be deposited within each other and these nested cones removed for final packing by removing the plate 11', and another plate 11' can be introduced so that the operation may be continued while the nested cones are being removed and placed in the shipping container.

The described device is intended primarily for use with the cone making machine described in application for United State Letters Patent, Serial Number 405,052, filed August 21, 1920, which has become Patent No. 1,376,711 granted May 3, 1921, in which cones are made with uniform rapidity and, with which the shaft 30 may be readily applied to give the proper synchronized movements to the parts as described, but I do not limit myself to such use of the device, as it may be applied to many other machines and devices.

I do not limit myself to the particular size, shape, number or arrangement of parts, as shown and described, all of which may be varied without going beyond the scope of my invention as shown, described and claimed.

What I claim is:—

1. In a receptacle nesting device, in combination, a revoluble table carrying receiving members for receptacles, means for interrupting the revolution of the table, means for depositing a receptacle within a receiver at each period of non-revolution of the table and means whereby the table will be given a downwardly vertical movement by its revolution.

2. In a receptacle nesting device, in combination, a revoluble table carrying a plurality of receiving members for receptacles, means for synchronizing the revolution of the table with a receptacle delivering device whereby a receptacle will be deposited consecutively in each receiver and means whereby the revolution of the table will give it a downwardly vertical movement.

3. In a receptacle nesting device, in combination, a revoluble table having a plurality of openings, a member carrying a plurality of receiving members for receptacles capable of insertion through the table openings, means for revolving the table, means for interrupting the revolution of the table, means for depositing a receptacle within a receiver at each period of non-revolution of the table and means whereby the table will be given a downwardly vertical movement by its revolution.

4. In a receptacle nesting device, in combination, a revoluble table having a plurality of openings, a member carrying a plurality of receiving members capable of insertion through the table openings, means for synchronizing the revolution of the table with a receptacle delivering device whereby a receptacle will be deposited consequently in each receiver and means whereby the revolution of the table will give it a downwardly vertical movement.

5. In a receptacle nesting device, in combination, a threaded revoluble shaft, means for revolving the shaft, means for interrupting the revolution of the shaft, a table fixedly attached to the shaft carrying a plurality of receivers, means for depositing a receptacle in a receiver at the period of rest of the table and means whereby the shaft will be given a downwardly vertical movement by its revolution.

6. In a receptacle nesting device, in combination, a threaded revoluble shaft, means for revolving the shaft, means for interrupting the revolution of the shaft, a table fixedly attached to the shaft carrying a plurality of receivers, means for depositing a receptacle in a receiver at the period of rest of the table, means for imparting a partial revolution to the table after each receptacle deposit and means whereby the shaft will be given a downwardly vertical movement by its revolution.

7. In a receptacle nesting device, in combination, a threaded revoluble shaft, means for revolving the shaft, means for interrupting the revolution of the shaft, a table fixedly attached to the shaft carrying a plurality of receivers, means for depositing a receptacle in a receiver at the period of rest of the table, means whereby the shaft may be given a free vertical movement and means whereby the shaft will be given a downwardly vertical movement by its revolution.

8. In a receptacle nesting device, in combination, a threaded revoluble shaft, threaded means meshing with the shaft threads for revolving the shaft, means for unmeshing the threaded means from the shaft allowing a free vertical movement to the shaft, means for interrupting the revolution of the shaft, a table fixedly attached to the shaft carrying a plurality of receivers, means for depositing a receptacle in a receiver at the period of rest of the table and means whereby the shaft will be given a downwardly vertical movement by its revolution.

9. In a receptacle nesting device, in combination, a threaded revoluble shaft, threaded means meshing with the shaft threads for revolving the shaft, means for unmeshing the threaded means from the shaft allowing a free vertical movement to the shaft, means for interrupting the revolution of the shaft, a table fixedly attached to the shaft carrying a plurality of receivers, means for depositing a receptacle in a receiver at the period of rest of the table, means for imparting a partial revolution of the table after each receptacle deposit and means whereby the shaft will be given a downwardly vertical movement by its revolution.

10. In a receptacle nesting device, in combination, a threaded revoluble shaft, a table fixedly attached to the shaft carrying a plurality of receivers, a plate carried by the shaft, a series of pins carried by the plate, means abutable upon the pins for partially revolving the plate, means for depositing a receptacle in a receiver at the period of rest of the table and means whereby the shaft will be given a downwardly vertical movement by its revolution.

11. In a receptacle nesting device, in combination, a threaded revoluble shaft, a table fixedly attached to the shaft carrying a plurality of receivers, a plate carried by the shaft, a series of pins carried by the plate, means abutable upon the pins for partially revolving the plate, means for depositing a receptacle in a receiver at the period of rest of the table, means whereby the shaft may be given a free vertical movement and means whereby the shaft will be given a downwardly vertical movement by its revolution.

12. In a receptacle nesting device, in combination, a threaded revoluble shaft, threaded means meshing with the shaft threads for revolving the shaft, means for unmeshing the threaded means from the shaft allowing a free vertical movement to the shaft, a plate carried by the shaft, a series of pins carried by the plate, means abutable upon the pins for partially revolving the plate, means for depositing a receptacle in a receiver at the period of rest of the table and means whereby the shaft will be given a downwardly vertical movement by its revolution.

13. In a receptacle nesting device, in combination, a threaded revoluble shaft, threaded means meshing with the shaft threads for revolving the shaft, means for unmeshing the threaded means from the shaft allowing a free vertical movement to the shaft, a plate carried by the shaft, a series of pins carried by the plate, means abutable upon the pins for partially revolving the plate, means for depositing a receptacle in a receiver at the period of rest of the table, means whereby the shaft may be given a free vertical movement and means whereby the shaft will be given a downwardly vertical movement by its revolution.

14. In a receptacle nesting device, in combination, a threaded revoluble shaft, means for revolving the shaft, means for interrupting the revolution of the shaft, a table fixedly attached to the shaft carrying a plurality of receivers, means for synchronizing the revolution of the table with a receptacle delivering device whereby a receptacle will be deposited consecutively in each receiver and means whereby the shaft will be given a downwardly vertical movement by its revolution.

15. In a receptacle nesting device, in combination, a threaded revoluble shaft, means for revolving the shaft, means for interrupting the revolution of the shaft, a table fixedly attached to the shaft carrying a plurality of receivers, means for synchronizing the revolution of the table with a receptacle delivering device whereby a receptacle will be deposited consecutively in each receiver, means for imparting a partial revolution to the table after each receptacle deposit and means whereby the shaft will be given a downwardly vertical movement by its revolution.

16. In a receptacle nesting device, in combination, a threaded revoluble shaft, means for revolving the shaft, means for interrupting the revolution of the shaft, a table fixedly attached to the shaft carrying a plurality of receivers, means for synchronizing the revolution of the table with a receptacle delivering device whereby a receptacle will be deposited consecutively in each receiver, means for imparting a partial revolution to the table after each receptacle deposit, means whereby the shaft may be given a free vertical movement and means whereby the shaft will be given a downwardly vertical movement by its revolution.

17. In a receptacle nesting device, in combination, a threaded revoluble shaft, threaded means meshing with the shaft threads for revolving the shaft, means for unmeshing the threaded means from the shaft allowing a free vertical movement to the shaft, means for interrupting the revolution of the shaft, a table fixedly attached to the shaft carrying a plurality of receivers, means for synchronizing the revolution of the table with a receptacle delivering device whereby a receptacle will be deposited consecutively in each receiver and means whereby the shaft will be given a downwardly vertical movement by its revolution.

18. In a receptacle nesting device, in combination, a threaded revoluble shaft, a table fixedly attached to the shaft carrying a plurality of receivers, a plate carried by the shaft, a series of pins carried by the plate, means abutable upon the pins for partially revolving the plate, means for synchronizing the revolution of the table with a receptacle delivering device whereby a receptacle will be deposited consecutively in each receiver, means for depositing a receptacle in a receiver at the period of rest of the table and means whereby the shaft will be given a downwardly vertical movement by its revolution.

19. In a receptacle nesting device, in combination, a threaded revoluble shaft, a table fixedly attached to the shaft carrying a plurality of receivers, a plate carried by the shaft, a series of pins carried by the plate, means abutable upon the pins for partially revolving the plate, means for synchronizing the revolution of the table with a receptacle delivering device whereby a receptacle will be deposited consecutively in each receiver, means for depositing a receptacle in a receiver at the period of rest of the table, means whereby the shaft may be given a free vertical movement and means whereby the shaft will be given a downwardly vertical movement by its revolution.

20. In a receptacle nesting device, in combination, a threaded revoluble shaft, threaded means meshing with the shaft threads for revolving the shaft, means for unmeshing the threaded means from the shaft allowing a free vertical movement to the shaft, a plate carried by the shaft, a series of pins carried by the plate, means abutable upon the pins for partially revolving the plate, means for synchronizing the revolution of the table with a receptacle delivering device whereby a receptacle will be deposited consecutively in each receiver, means whereby the shaft may be given a free vertical movement and means whereby the shaft will be given a downwardly vertical movement by its revolution.

Signed at New York in the county of New York and State of New York this 9th day of May, 1921.

ISAAC ISRAEL.